UNITED STATES PATENT OFFICE.

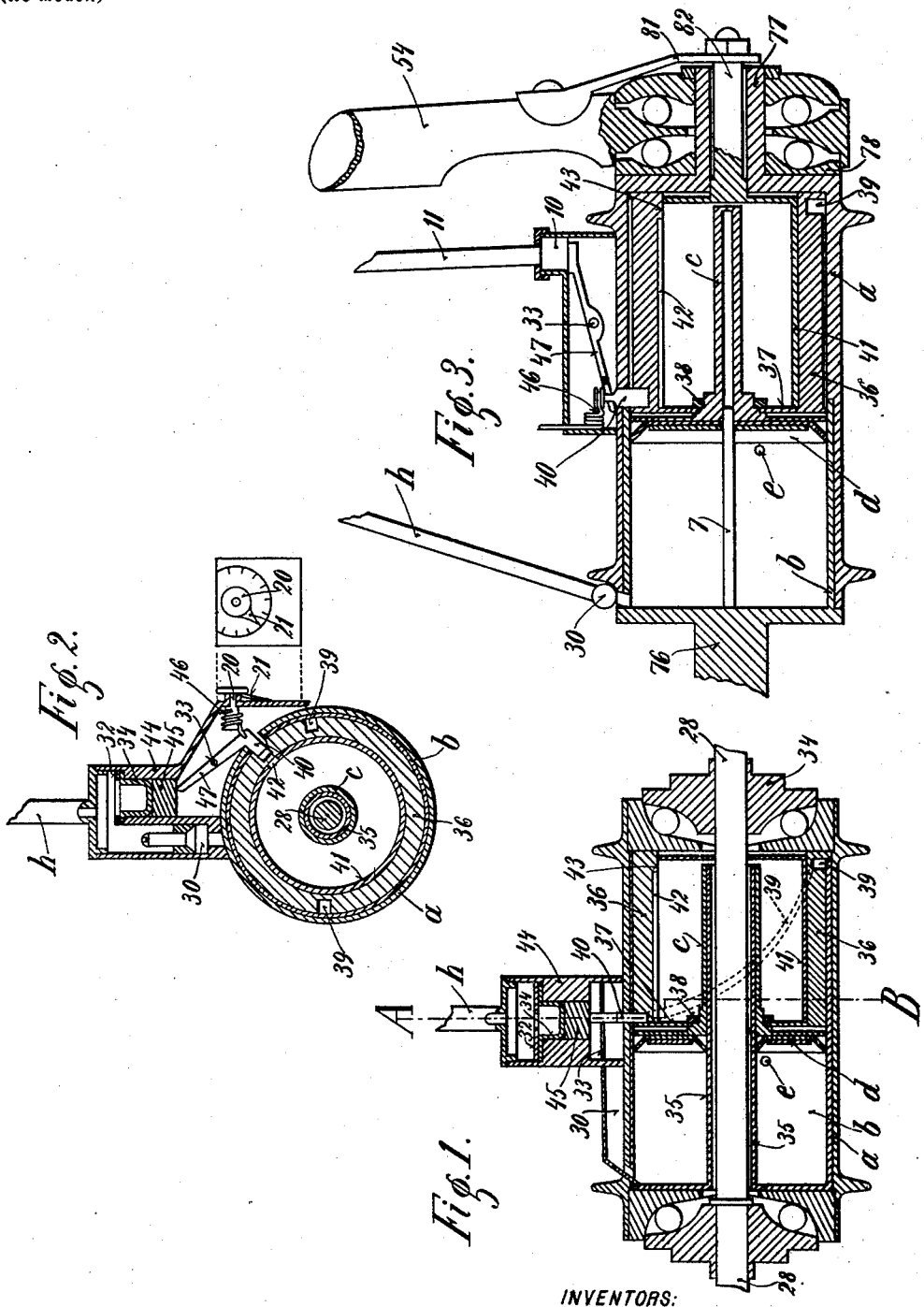

CARL NIELSEN, ANDERS CHRISTIAN ANDERSEN, AND LAURITS SOPHUS ANDERSEN, OF ODENSE, DENMARK.

AUTOMATIC PUMP.

SPECIFICATION forming part of Letters Patent No. 713,667, dated November 18, 1902.

Application filed February 26, 1901. Serial No. 48,898. (No model.)

*To all whom it may concern:*

Be it known that we, CARL NIELSEN, merchant, and ANDERS CHRISTIAN ANDERSEN and LAURITS SOPHUS ANDERSEN, saddlers, of Odense, Island of Funen, in the Kingdom of Denmark, have invented certain new and useful Improvements in Automatic Pumps, of which the following is a specification.

The present invention refers to an air-pump which during the driving fills the pneumatic tires of the vehicle with air and which stops or again recommences the pumping when the desired pressure has been reached or has gone below a certain minimum.

The pump is arranged in such a way that the pumping-cylinder is formed by the wheel-hub, and the invention is shown on the accompanying drawings in two constructional forms.

Figure 1 shows an axial section through one of the constructional forms. Fig. 2 is a section on the line A B of Fig. 1. Fig. 3 is an axial section through the other constructional form of the invention.

In both constructional forms shown $a$ is the hub, in which is inserted a cylinder $b$, which serves as pumping-cylinder. The axle 28 of the hub is passed through an axial tube 35 in the cylinder $b$ and upon which an annular piston $d$ can slide forward and backward. The piston $d$ has a tube-shaped piston-rod $c$, which serves as guide for the piston during its travel. The piston $d$ moves forward and backward in the one half only of the cylinder $b$—in Fig. 1 the left half. Between a nut 38, screwed onto the piston-rod $c$, and a fixed shoulder upon the same rod there is a plate 37, firmly mounted upon a cylinder 36, which is movable backward and forward in the right half of the cylinder $b$, Fig. 1, the outside surface of the cylinder 36 having in itself a screw-shaped groove 39. The cylinder 36 is provided with a projection 43, engaging a rectilinear groove 42 of a cylinder 41, mounted firmly upon the axle 28 and located inside the cylinder 36. The cylinder 36 is, by means of the projection 43 and the groove 42, prevented from turning with the hub $a$, while the piston $d$ follows the rotation of the hub, the edge of the plate 37 being able to slide in the groove between the said shoulder and the nut 38. A pin 40 is passed through a hole in the cylinder $b$ and the hub $a$, projecting into the groove 39. The cylinder 36 being prevented from following the rotation of the hub it will consequently when the hub rotates during the driving slide to and fro in the cylinder $b$ and will during this movement bring along the piston $d$. In the cylinder $b$ is an opening $e$ leading out to the air, and the piston will, therefore, during its movement compress the air that enters through the hole $e$. From the cylinder $b$ a channel 30 leads to a tube $h$, which is in connection with the pneumatic tire, and this one will then when the hub rotates during the driving be filled with compressed air.

In order that the movement of the piston can be automatically arrested when the desired pressure in the ring has been reached, the pin 40 is mounted upon one arm of a lever 47, turnable around an axle 33, and whose other arm can be actuated by a piston 45 of a cylinder 44, this piston being in its turn actuated by the air-pressure of the pneumatic tire. In order to obtain air-tightness around the piston 45, an elastic hood is in the cylinder 44 placed over the piston, its edges being held tightly in the cylinder by a ring 32. When the pressure in the pneumatic tire increases, the piston 45 will press upon the lever 47 and turn it, a spring 46, whose other end actuates the lever 47, being simultaneously tightened. The tension of the spring 46 is adjusted thus, so that the pin 40 is just free of the groove 39 when the pressure in the pneumatic tire has reached the desired maximum. When the pressure goes below this, the spring 46 expands and the pin 40 again projects into the groove 39, so that the pumping recommences.

In order that the tension of the spring 46 can be varied, and with it the normal pressure in the pneumatic tire, the spring is mounted upon a turntable axle 20 and supplied with a hand pointing upon a scale 16.

In the constructional form shown in Fig. 3 the axle 28 is left out and the hub $a$ is supplied with two trunnions 76 and 77, resting in suitable bearings in the cycle-frame. The cylinder 41 is supplied with an arm 82, passing through the trunnion 77, and by means of a bracket 81 rigidly connected with a part of the cycle-frame 54. The piston-rod c has an axial boring, in which a guiding-pin 7 slides during the movement of the piston. The lever 47 is fork-shaped in the one end and catches around a neck of the pin 40, which is actuated by the spring. The other arm of the lever bears against an elastic bag 10 of a rubber tube 11 or the like, which is in connection with the pneumatic tire. The bag 10 is placed inside a casing, which surrounds it on all sides, except the bottom, where it bears against the lever 47. When the pressure in the tire increases, the bottom of the bag 10 presses against the lever, and this one will then act upon the pin 40 in a similar manner as in the previously-described constructional form.

Having now particularly described and ascertained the nature of this said invention and in what manner the same is to be performed, we declare that what we claim is—

1. In combination with the hub of the wheel, an annular piston d inside the same and turning therewith, a cylinder 36 within the hub having reciprocating but no rotary movement, said cylinder having a groove about its outer surface and a pin projecting from the hub into the said groove to reciprocate the cylinder 36, substantially as described.

2. In combination with the hub of the wheel, an air-passage between the same and the tire, a reciprocating piston therein, a pin-and-groove connection for operating the said piston and means whereby the said pin is thrown out of action when the air in the tire reaches a certain pressure, substantially as described.

3. In combination, a hub having an air-passage between the same and the tire, a fixed axle 28, a cylinder 41 within the hub fixed upon the axle, a cylinder 36 within the hub into which the cylinder 41 is fitted, a pin-and-groove connection between the cylinders 36 and 41 to allow the cylinder 36 to move longitudinally but prevent rotary movement thereof and means for reciprocating the cylinder 36 from the rotation of the hub, substantially as described.

In testimony that we claim the foregoing as our invention we have signed our names in presence of two subscribing witnesses.

CARL NIELSEN.
ANDERS CHRISTIAN ANDERSEN.
LAURITS SOPHUS ANDERSEN.

Witnesses:
J. C. JACOBSEN,
ERNEST BOUTARD.